US009020816B2

(12) United States Patent  
McClain

(10) Patent No.: US 9,020,816 B2  
(45) Date of Patent: Apr. 28, 2015

(54) HIDDEN MARKOV MODEL FOR SPEECH PROCESSING WITH TRAINING METHOD

(75) Inventor: Matthew McClain, Austin, TX (US)

(73) Assignee: 21CT, Inc., Austin, TX (US)

(*) Notice: Subject to any disclaimer, the term of this patent is extended or adjusted under 35 U.S.C. 154(b) by 1078 days.

(21) Appl. No.: 13/059,048

(22) PCT Filed: Aug. 13, 2009

(86) PCT No.: PCT/US2009/053796
§ 371 (c)(1),
(2), (4) Date: May 5, 2011

(87) PCT Pub. No.: WO2010/019831
PCT Pub. Date: Feb. 18, 2010

(65) Prior Publication Data
US 2011/0208521 A1    Aug. 25, 2011

Related U.S. Application Data

(60) Provisional application No. 61/089,036, filed on Aug. 14, 2008.

(51) Int. Cl.
*G10L 15/00* (2013.01)
*G10L 15/14* (2006.01)
*G10L 17/26* (2013.01)
*G10L 25/24* (2013.01)

(52) U.S. Cl.
CPC ............... *G10L 15/142* (2013.01); *G10L 17/26* (2013.01); *G10L 25/24* (2013.01)

(58) Field of Classification Search
CPC ..... G10L 15/20; G10L 25/78; G10L 21/0208; G10L 15/02; G10L 25/87
See application file for complete search history.

(56) References Cited

U.S. PATENT DOCUMENTS 4,481,593 A * 11/1984 Bahler ......................... 704/253
4,736,429 A    4/1988 Niyada et al.
(Continued)

FOREIGN PATENT DOCUMENTS

JP        08-339446      12/1996
JP        2003-202885     7/2003

OTHER PUBLICATIONS

PCT International Search Report and Written Opinion for International Application No. PCT/US2009/053796 dated Dec. 28, 2009.
(Continued)

*Primary Examiner* — Pierre-Louis Desir
*Assistant Examiner* — Fariba Sirjani
(74) *Attorney, Agent, or Firm* — Andrews Kurth LLP; J. Roger Williams, Jr.

(57) ABSTRACT

A method, system and apparatus are shown for identifying non-language speech sounds in a speech or audio signal. An audio signal is segmented and feature vectors are extracted from the segments of the audio signal. The segment is classified using a hidden Markov model (HMM) that has been trained on sequences of these feature vectors. Post-processing components can be utilized to enhance classification. An embodiment is described in which the hidden Markov model is used to classify a segment as a language speech sound or one of a variety of non-language speech sounds. Another embodiment is described in which the hidden Markov model is trained using discriminative learning.

27 Claims, 4 Drawing Sheets

(56) References Cited

U.S. PATENT DOCUMENTS

| | | | |
|---|---|---|---|
| 4,817,159 A | 3/1989 | Hoshimi et al. | |
| 4,829,577 A * | 5/1989 | Kuroda et al. | 704/244 |
| 4,977,599 A * | 12/1990 | Bahl et al. | 704/256.4 |
| 4,979,212 A | 12/1990 | Yamada et al. | |
| 5,033,089 A | 7/1991 | Fujimoto et al. | |
| 5,151,940 A | 9/1992 | Okazaki et al. | |
| 5,339,385 A | 8/1994 | Higgans | |
| 5,381,572 A | 1/1995 | Park | |
| 5,440,662 A | 8/1995 | Sukkar | |
| 5,509,104 A | 4/1996 | Lee et al. | |
| 5,524,169 A * | 6/1996 | Cohen et al. | 704/231 |
| 5,577,165 A | 11/1996 | Takebayashi et al. | |
| 5,596,680 A | 1/1997 | Chow et al. | |
| 5,634,086 A | 5/1997 | Rtischev et al. | |
| 5,649,057 A * | 7/1997 | Lee et al. | 704/256 |
| 5,675,704 A * | 10/1997 | Juang et al. | 704/246 |
| 5,692,104 A | 11/1997 | Chow et al. | |
| 5,710,864 A | 1/1998 | Juang et al. | |
| 5,710,866 A * | 1/1998 | Alleva et al. | 704/256.4 |
| 5,740,318 A | 4/1998 | Naito et al. | |
| 5,754,681 A | 5/1998 | Watanabe et al. | |
| 5,805,771 A * | 9/1998 | Muthusamy et al. | 704/232 |
| 5,822,730 A | 10/1998 | Roth et al. | |
| 5,832,429 A | 11/1998 | Gammel et al. | |
| 5,842,165 A | 11/1998 | Raman et al. | |
| 5,848,388 A | 12/1998 | Power et al. | |
| 5,865,626 A * | 2/1999 | Beattie et al. | 434/185 |
| 5,895,448 A | 4/1999 | Vysotsky et al. | |
| 5,918,222 A * | 6/1999 | Fukui et al. | 1/1 |
| 5,918,223 A * | 6/1999 | Blum et al. | 1/1 |
| 5,946,655 A | 8/1999 | Steinbiss et al. | |
| 5,950,158 A | 9/1999 | Wang | |
| 5,950,159 A * | 9/1999 | Knill | 704/251 |
| 5,956,683 A * | 9/1999 | Jacobs et al. | 704/270.1 |
| 5,960,396 A | 9/1999 | Shinoda | |
| 5,960,399 A * | 9/1999 | Barclay et al. | 704/270.1 |
| 5,963,902 A | 10/1999 | Wang | |
| 5,987,414 A * | 11/1999 | Sabourin et al. | 704/270 |
| 6,058,363 A | 5/2000 | Ramalingam | |
| 6,061,646 A * | 5/2000 | Martino et al. | 704/3 |
| 6,076,053 A | 6/2000 | Juang et al. | |
| 6,076,054 A | 6/2000 | Vysotsky et al. | |
| 6,076,057 A * | 6/2000 | Narayanan et al. | 704/256.2 |
| 6,098,040 A | 8/2000 | Petroni et al. | |
| 6,188,982 B1 | 2/2001 | Chiang | |
| 6,195,634 B1 * | 2/2001 | Dudemaine et al. | 704/231 |
| 6,223,155 B1 | 4/2001 | Bayya | |
| 6,226,612 B1 | 5/2001 | Srenger et al. | |
| 6,275,800 B1 | 8/2001 | Chevalier et al. | |
| 6,292,778 B1 | 9/2001 | Sukkar | |
| 6,343,270 B1 * | 1/2002 | Bahl et al. | 704/257 |
| 6,381,572 B1 | 4/2002 | Ishimitsu et al. | |
| 6,405,168 B1 | 6/2002 | Bayya et al. | |
| 6,411,927 B1 | 6/2002 | Morin et al. | |
| 6,535,850 B1 * | 3/2003 | Bayya | 704/239 |
| 6,542,866 B1 | 4/2003 | Jiang et al. | |
| 6,671,669 B1 | 12/2003 | Garudadri et al. | |
| 6,675,143 B1 * | 1/2004 | Barnes et al. | 704/257 |
| 6,678,655 B2 * | 1/2004 | Hoory et al. | 704/223 |
| 6,691,090 B1 * | 2/2004 | Laurila et al. | 704/250 |
| 6,708,081 B2 | 3/2004 | Yoshida | |
| 6,708,150 B1 * | 3/2004 | Hirayama et al. | 704/243 |
| 6,778,959 B1 | 8/2004 | Wu et al. | |
| 6,836,758 B2 | 12/2004 | Bi et al. | |
| 6,873,953 B1 | 3/2005 | Lennig | |
| 6,960,393 B2 | 11/2005 | Yializis | |
| 6,985,860 B2 | 1/2006 | Nakatsuka | |
| 7,007,235 B1 | 2/2006 | Hussein et al. | |
| 7,076,430 B1 | 7/2006 | Cosatto et al. | |
| 7,107,214 B2 | 9/2006 | Nakatsuka | |
| 7,155,391 B2 * | 12/2006 | Taylor | 704/257 |
| 7,203,643 B2 * | 4/2007 | Garudadri | 704/233 |
| 7,219,056 B2 * | 5/2007 | Axelrod et al. | 704/235 |
| 7,263,484 B1 * | 8/2007 | Cardillo et al. | 704/236 |
| 7,302,451 B2 * | 11/2007 | Radhakrishnan et al. | 1/1 |
| 7,383,172 B1 * | 6/2008 | Jamieson | 704/9 |
| 7,389,230 B1 * | 6/2008 | Nelken | 704/255 |
| 7,409,407 B2 * | 8/2008 | Radhakrishnan et al. | 1/1 |
| 7,424,427 B2 | 9/2008 | Liu et al. | |
| 7,447,635 B1 | 11/2008 | Konopka et al. | |
| 7,640,159 B2 * | 12/2009 | Reich | 704/254 |
| 7,668,718 B2 * | 2/2010 | Kahn et al. | 704/270 |
| 7,783,488 B2 * | 8/2010 | Ben-David et al. | 704/270 |
| 8,219,384 B2 * | 7/2012 | Lloyd et al. | 704/8 |
| 8,275,616 B2 * | 9/2012 | Jung et al. | 704/240 |
| 8,442,827 B2 * | 5/2013 | Duffield | 704/254 |
| 8,635,068 B2 * | 1/2014 | Pulz et al. | 704/257 |
| 8,719,022 B2 * | 5/2014 | Arrowood et al. | 704/251 |
| 2001/0044719 A1 | 11/2001 | Casey | |
| 2002/0059065 A1 * | 5/2002 | Rajan | 704/226 |
| 2002/0059068 A1 * | 5/2002 | Rose et al. | 704/246 |
| 2002/0062212 A1 | 5/2002 | Nakatsuka | |
| 2002/0107695 A1 | 8/2002 | Roth et al. | |
| 2002/0116193 A1 | 8/2002 | Raddino et al. | |
| 2002/0194002 A1 | 12/2002 | Petrushin | |
| 2003/0055640 A1 | 3/2003 | Burshtein et al. | |
| 2003/0078780 A1 | 4/2003 | Kochanski et al. | |
| 2003/0115055 A1 * | 6/2003 | Gong | 704/233 |
| 2003/0205124 A1 * | 11/2003 | Foote et al. | 84/608 |
| 2004/0006468 A1 | 1/2004 | Gupta et al. | |
| 2004/0019483 A1 * | 1/2004 | Deng et al. | 704/239 |
| 2004/0024599 A1 | 2/2004 | Deisher | |
| 2004/0073425 A1 * | 4/2004 | Das et al. | 704/236 |
| 2004/0117187 A1 | 6/2004 | Ikeda | 704/256 |
| 2004/0138888 A1 * | 7/2004 | Ramabadran | 704/262 |
| 2004/0215454 A1 * | 10/2004 | Kobayashi et al. | 704/231 |
| 2004/0230432 A1 | 11/2004 | Liu et al. | |
| 2004/0267530 A1 | 12/2004 | He et al. | |
| 2005/0049865 A1 | 3/2005 | Yaxin et al. | |
| 2005/0049870 A1 | 3/2005 | Zhang et al. | |
| 2005/0080625 A1 * | 4/2005 | Bennett et al. | 704/249 |
| 2005/0102135 A1 | 5/2005 | Goronzy et al. | |
| 2005/0114388 A1 | 5/2005 | Goronzy et al. | |
| 2005/0119897 A1 * | 6/2005 | Bennett et al. | 704/270.1 |
| 2005/0131688 A1 | 6/2005 | Goronzy et al. | |
| 2005/0160449 A1 | 7/2005 | Goronzy et al. | |
| 2005/0246171 A1 | 11/2005 | Nakatsuka | |
| 2005/0256712 A1 | 11/2005 | Yamada et al. | 704/255 |
| 2006/0020461 A1 * | 1/2006 | Ogawa | 704/251 |
| 2006/0100862 A1 | 5/2006 | Deng et al. | 704/207 |
| 2006/0149548 A1 * | 7/2006 | Wang et al. | 704/254 |
| 2006/0178871 A1 * | 8/2006 | Seltzer et al. | 704/205 |
| 2007/0033042 A1 * | 2/2007 | Marcheret et al. | 704/255 |
| 2007/0067171 A1 | 3/2007 | Mahajan et al. | |
| 2007/0088548 A1 * | 4/2007 | Yamamoto et al. | 704/239 |
| 2007/0088552 A1 * | 4/2007 | Olsen | 704/256.2 |
| 2007/0192099 A1 * | 8/2007 | Suzuki et al. | 704/240 |
| 2007/0230372 A1 | 10/2007 | He et al. | |
| 2007/0237099 A1 | 10/2007 | He et al. | |
| 2007/0239451 A1 | 10/2007 | Luan et al. | |
| 2008/0004876 A1 | 1/2008 | He et al. | |
| 2008/0027725 A1 * | 1/2008 | Chu et al. | 704/257 |
| 2008/0037837 A1 * | 2/2008 | Noguchi et al. | 382/118 |
| 2008/0052075 A1 | 2/2008 | He et al. | |
| 2008/0052077 A1 * | 2/2008 | Bennett et al. | 704/257 |
| 2008/0052078 A1 * | 2/2008 | Bennett | 704/257 |
| 2008/0059188 A1 * | 3/2008 | Konopka et al. | 704/257 |
| 2008/0077404 A1 * | 3/2008 | Akamine et al. | 704/243 |
| 2008/0091424 A1 | 4/2008 | He et al. | |
| 2008/0120109 A1 * | 5/2008 | Ding | 704/255 |
| 2008/0147402 A1 * | 6/2008 | Jeon et al. | 704/251 |
| 2008/0162119 A1 * | 7/2008 | Lenhardt | 704/200.1 |
| 2008/0181489 A1 | 7/2008 | Fu et al. | |
| 2008/0195381 A1 * | 8/2008 | Soong et al. | 704/200 |
| 2008/0201139 A1 | 8/2008 | Yu et al. | |
| 2008/0208578 A1 * | 8/2008 | Geller | 704/243 |
| 2008/0234558 A1 * | 9/2008 | Kumar et al. | 600/306 |
| 2008/0249771 A1 * | 10/2008 | Wahab | 704/233 |
| 2008/0294433 A1 | 11/2008 | Yeung et al. | |
| 2009/0055182 A1 | 2/2009 | He et al. | |
| 2009/0112573 A1 | 4/2009 | He | |
| 2009/0112595 A1 * | 4/2009 | Ljolje | 704/256.2 |
| 2009/0138265 A1 | 5/2009 | Willett et al. | |
| 2009/0155751 A1 | 6/2009 | Paul et al. | |

(56) References Cited

U.S. PATENT DOCUMENTS

| | | | | |
|---|---|---|---|---|
| 2009/0204409 | A1* | 8/2009 | Mozer et al. | 704/275 |
| 2009/0271195 | A1* | 10/2009 | Kitade et al. | 704/239 |
| 2010/0286984 | A1* | 11/2010 | Wandinger et al. | 704/251 |
| 2011/0004473 | A1* | 1/2011 | Laperdon et al. | 704/243 |
| 2011/0040561 | A1* | 2/2011 | Vair et al. | 704/240 |
| 2011/0066634 | A1* | 3/2011 | Phillips et al. | 707/769 |
| 2011/0288859 | A1* | 11/2011 | Taylor et al. | 704/231 |
| 2013/0238336 | A1* | 9/2013 | Sung et al. | 704/255 |

OTHER PUBLICATIONS

Abdulla, Waleed H., Kasabox, Nikola K., The Concepts of Hidden Markov Model in Speech Recognition, Technical Report TR99/09; Department of Knowledge Engineering Lab, University of Otago, New Zealand, 1999.

Rabiner, Lawrence R., A Tutorial on Hidden Markov Models and Selected Applications in Speech Recognition, Proceedings of the IEEE, vol. 77, No. 2, Feb. 1989.

Chen, Zheng, Power Point Presentation titled "Hidden Markov Models and its Application in Automatic Speech Recognition," dated Oct. 5, 2006.

He, Xiaodong, Deng, Li, Discriminative Learning in Sequential Pattern Recognition, IEEE Signal Processing Magazine, Sep. 2008, pp. 14-36, IEEE Log No. 8825949.

Collins, Michael, Discriminative Training Methods for Hidden Markov Models: Theory and Experiments with Perceptron Algorithms, AT&T Labs-Research, Florham Park, New Jersey.

McClain, Matthew, Romanowski, Brian, Speech endpoint detection with non-language speech sounds for generic speech processing applications, Sensors, and Command, Control, Communications, and Intelligence (C31) Technologies for Homeland Security and Homeland Defense VIII; Edited by Carapezza, Edward M., Proceedings of the SPIE, vol. 7305 (2009)., pp. 73051B-73051B-9 (2009).

Wikipedia definition for Viterbi Algorithm, Http://en.wikipedia.org/wiki/Viterbi_algorithm, Aug. 10, 2009.

Hidden Markov Models, presentation adapted from [Rabiner & Juang, 1986] and [Charniak, 1993], http://www.cs.brown.edu/research/ai/dynamics/tutorial/Documents/HiddenMarkovModels.html, Aug. 7, 2009.

Hidden Markov Model webpage, Aug. 29, 2000, 4 pages, http://everything2.com/title/Hidden+Markov+Model.

Wikipedia definition for Speech recognition, Http://en.wikipedia.org/wiki/Speech_recognition, Aug. 6, 2009.

* cited by examiner

HIDDEN MARKOV MODEL FOR SPEECH PROCESSING WITH TRAINING METHOD

CROSS-REFERENCE TO RELATED APPLICATIONS

This application claims the benefit of U.S. Provisional Application No. 61/089,036 filed on 14 Aug. 2008, which is hereby incorporated by reference in its entirety.

GOVERNMENT LICENSE RIGHTS

This invention was made with United States Government support under Contracts FA8750-07-C-0105 and FA8750-08-C-0122 awarded by the United States Air Force Research Laboratory. The United States Government has certain rights in the invention.

BACKGROUND OF THE INVENTION

Field of the Invention

This invention relates to the field of speech processing, including the use of hidden Markov models to model and classify speech components.

Speech processing applications require the detection of speech regions in audio. Traditionally, this problem has been posed as distinguishing background noise from sounds produced by speakers. However, spontaneous speech contains a variety of human-produced sounds that are not modeled by speech processing applications and thus result in errors. These sounds are defined as non-language speech sounds, or NLSS, i.e., human-produced sounds that do not carry linguistic information. The ability to detect this class of sounds as a pre-processing step may significantly improve the performance of speech processing applications, and have other potential uses. As well, the detection of specific types of NLSS may have application in other speech processing technologies.

One exemplary application of detection of non-language speech sounds (NLSS) is speech endpoint detection. Detecting NLSS during speech endpoint detection can improve the performance of follow-on speech processing applications. Thus, working definitions of NLSS include the types of human-produced sounds that induce errors in the follow-on speech processing application. The term language speech sounds (LSS) will be used to indicate human speech sounds that carry linguistic information.

In order to perform NLSS detection as a pre-processing step for generic speech processing applications, NLSS detection preferably is robust to a variety of input conditions, including the language being spoken. As a result, higher-level linguistic analysis approaches are not considered as a part of a preferred solution. A preferred approach to NLSS detection should be robust to speaker, channel, and noise conditions.

Examples of NLSS include coughs, breaths, laughs, clicks, whistles, and filled pause sounds such as "um" and "ah" in English. Backchannel utterances such as "uh-huh" and "yeah" in English may also be considered NLSS in cases where they are used by listeners in dialogues to communicate that they are following the conversation (not as affirmative responses to specific questions). Background speech is also considered NLSS in that it is human-produced but interferes with speech processing. A significant challenge with distinguishing NLSS from LSS is that both types of sound are produced using the same mechanism: the human vocal tract. For many types of NLSS, this means that the characteristics of their short-time spectrum are similar to that of certain phonemes. For example, a cough is produced in a similar manner to a plosive. The main difference is that the location of the closure is in the throat, while the location of closure for most plosives is near the lips. Backchannel utterances and filled pauses are even more problematic because they can be identical to LSS utterances. This becomes even more difficult when attempting to detect NLSS without knowledge of the language being spoken. While some past work includes some of these sounds in speech endpoint detection, there has been little work to address the effects of broad categories of NLSS in speech processing applications.

SUMMARY

Shown here are a computerized method and apparatus for detecting non-language speech sounds in an audio signal. The method comprises realizing a hidden Markov model (HMM) with a computer. The HMM includes a plurality of states, at least one of which is associated with a non-language speech sound. A segment is isolated from the audio signal, and a feature is extracted from the segment, the feature being one of: mel-frequency cepstral coefficients (MFCCs), pitch confidence, cepstral stationarity, and cepstral variance. The first feature is used to associate the segment with one or more of the states of the HMM, and the segment is classified as a language speech sound or a non-language speech sound. The apparatus comprises a programmed processor and computer-readable media storing instructions that, when executed on the programmed processor, perform the steps of the method. Also disclosed are embodiments of the method which use a plurality of features to associate the segment with one or more states of the HMM, and embodiments which extract features from a plurality of segments and associate the plurality of segments with one or more states of the HMM.

Also shown here is a computerized method of classifying sounds in an audio signal. The method comprises realizing in a computer an HMM with a plurality of hidden Markov states. A plurality of classification labels are provided with a one-to-many mapping between classification labels and hidden Markov states. An observation sequence which comprises at least one observation for each one of a plurality of segments isolated from the audio signal is determined. The observation sequence is associated with a sequence of hidden Markov states, whereby the one-to-many mapping determines a classification label for the plurality of segments.

Also disclosed is method of training an HMM, including the HMMs disclosed here, including a method comprising discriminative learning.

Also shown is a computerized speech recognition system for detecting non-language speech sounds comprising: a pre-processor; a signal processor, a computerized hidden Markov model comprising hidden Markov states and many-to-one mappings between the hidden Markov states and a plurality of classification labels, and a post-processor. At least one of the classification labels comprises a non-language speech sound. The pre-processor isolates segments from an audio signal. The signal processor extracts from each of the segments one or more of the following features: mel-frequency cepstral coefficients (MFCCs), a pitch confidence measurement, a cepstral stationarity measurement, or a cepstral variance measurement. The computerized HMM uses the features to associate each of the segments with one or more of the hidden Markov states and classifies each of the segments as a language speech sound or a non-language speech sound.

DETAILED DESCRIPTION

Figure 1:
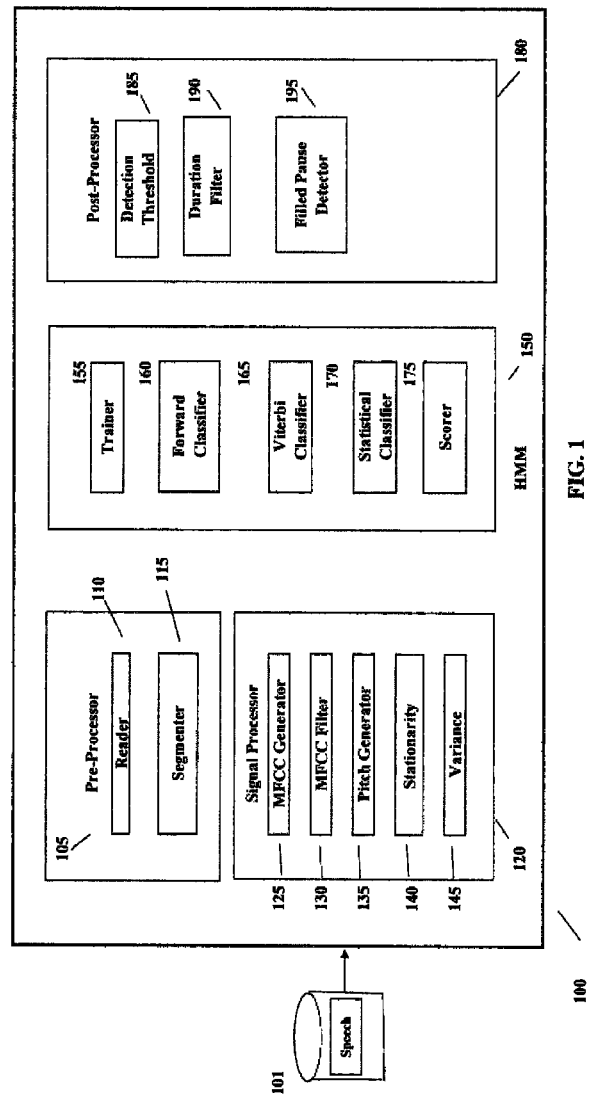
FIG. 1 depicts an exemplary speech recognition system.

FIG. 1 depicts system 100 for detecting non-language speech sounds, comprising an input audio signal 101, pre-processor 105, signal processor 120, hidden Markov model 150, and post-processor 180. Each of these components will be described in more detail below.

Figure 2:
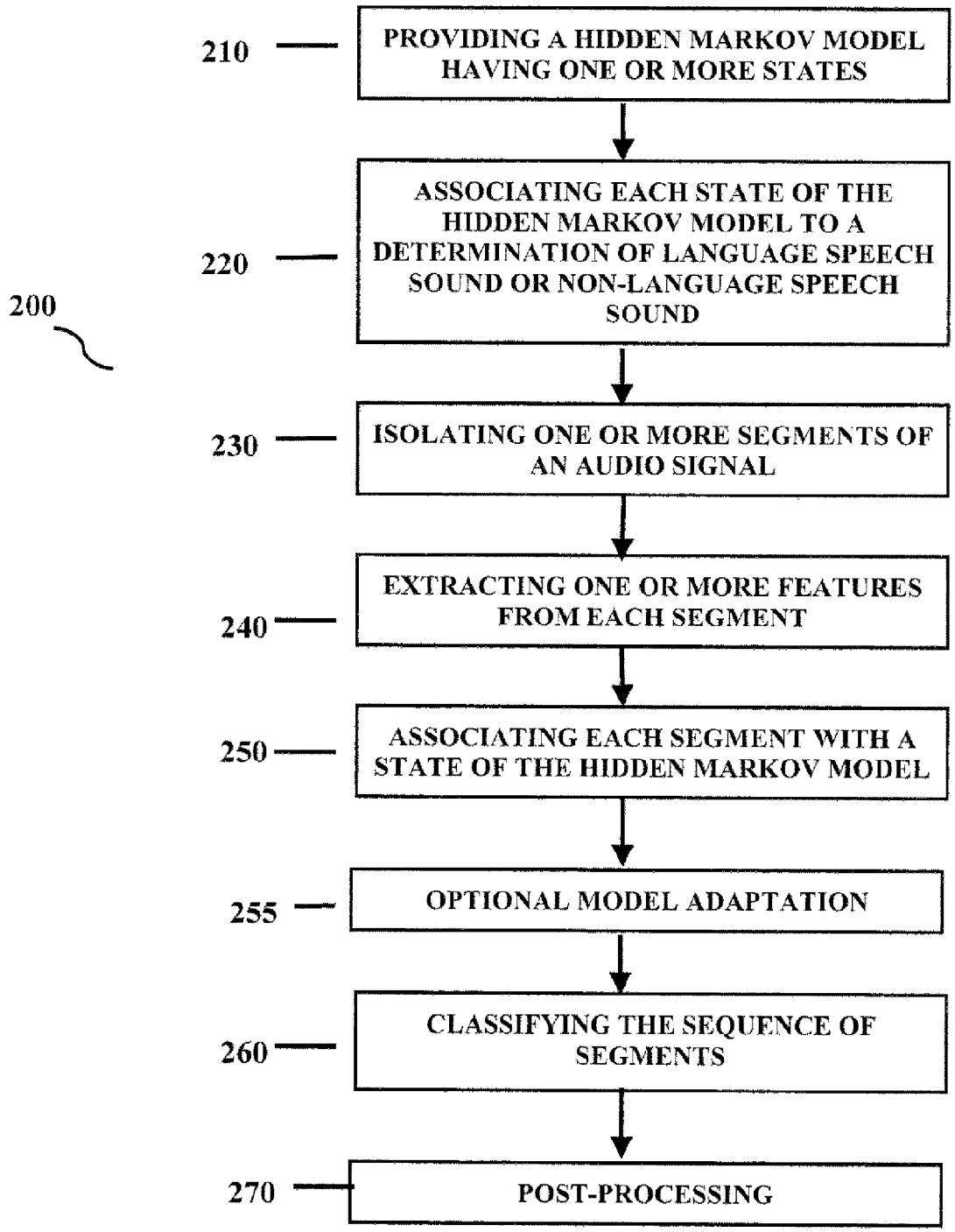
FIG. 2 depicts the steps of an exemplary method for detecting non-language speech sounds.

FIG. 2 depicts a method 200 for detecting non-language speech sounds, comprising: providing a speech production model in the nature of a hidden Markov model having one or more states (210); associating each step of the hidden Markov model to a determination of a language speech sound or a non-language speech sound (220); isolating one or more segments of an audio signal (230); extracting one or more features from each segment (240); associating each segment with one or more states of the hidden Markov model (250); optional model adaptation (255); classifying the sequence of segments (260); and post-processing (270). The steps of the method 200 will be described in more detail below.

Step 210 of method 200 includes providing a speech production model. A preferred embodiment uses a hidden Markov model (HMM) to model speech production because HMMs have proved to be useful in a variety of speech processing applications. An HMM is a probabilistic discrete time model in which the underlying structure is a set of hidden states. Observable outputs (observations or features) are generated at each time increment by selecting the next state of the model and generating an output according to that state's probability distribution over the outputs.

The implementation in a preferred embodiment of HMMs uses multivariate unimodal Gaussian distributions with full covariance matrices for the state probability distributions. The fact that the model is Markovian means that the probability of being in a state at a time t is independent of the states before time t−1, given the state at time t−1. This state transition behavior is defined by a state-transition matrix which gives the probability of each state-to-state transition. Applied to speech processing, the states of the HMM represent classes of sounds, the state distributions represent the acoustic properties of these classes of sounds, and the state transition behavior captures the possible combinations of sounds.

In a preferred embodiment, multimodal Gaussian probability distribution functions (PDFs), also called Gaussian mixture PDFs, are used for each HMM state's observation probability distributions. A multimodal Gaussian PDF is a weighted combination of Gaussian PDFs (also called normal PDFs), such that the probability of an observation for a multimodal Gaussian PDF is a weighted sum of the probabilities of that observation for a set of Gaussian PDFs. Each Gaussian PDF in a multimodal Gaussian PDF is referred to as a mixture component. The parameters of a multimodal Gaussian PDF is a vector of mixture component weights and the parameters for the mixture component Gaussian PDFs. The parameters of a Gaussian PDF are the observation mean vector (one value for each feature in the observation feature vector) and the observation covariance matrix (one value for each pair of features in the observation feature vector, including each feature paired with itself).

An HMM (specified by parameter set Λ) that uses multimodal Gaussian PDFs for state observation distributions is specified by 5 parameters: the initial state probabilities, the state transition matrix, and the mixture component weight vector, mean vectors, and covariance matrices of the observation probability distributions. Notationally, $\Lambda = \{\pi, A, w, \mu, \Sigma\}$ where $\pi$=the vector of initial state probabilities $\pi_i$=the ith element of $\pi$, defined as the probability of occupying state i at time t=1

A=the state transition matrix=

$\alpha_{ij}$=the element in the ith row and jth column of A, defined as the probability of occupying state j at time t given that state i was occupied at time t−1

$w_{im}$=the mth mixture component weight of the observation distribution for state i $\mu_{im}$=the mean vector for the mth mixture component of the observation distribution for state i $\mu_{imk}$=the mean value (scalar) for feature k in the mth mixture component of the observation distribution in state i $\Sigma_{im}$=the covariance matrix for the mth mixture component of the observation distribution for state i $\sigma_{imkl}$=the covariance value (scalar) for features k and l in the mth mixture component of the observation distribution for state i The HMM preferably is ergodic. An ergodic HMM is one in which any state is allowed to follow any other state, as specified by the state transition probability parameters. Another type of HMM is a left-to-right HMM, in which there is a specific sequential ordering of the HMM states, such that each state can only be followed by itself and one other state.

Figure 3:
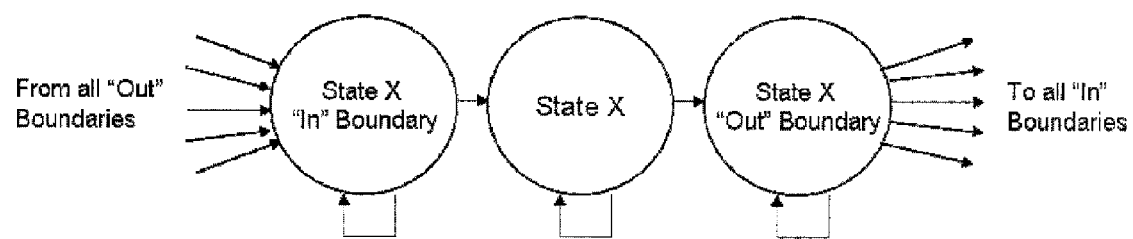
FIG. 3 depicts a HMM boundary state diagram.

Imposing structure on the HMM state transition matrix can improve results. For example, input and output boundary states can be added to ergodic HMM states. FIG. 3 graphically depicts input and output boundary states surrounding an internal state for an ergodic HMM. In a preferred embodiment, distributions used for the boundary states are initialized to the same distribution as the internal state, with the mean of the cepstral stationarity features (explained in more detail below) adjusted to reflect the fact that the MFCC values will have more variation between sound categories, which occurs in the boundary states. This type of boundary state preferably is not used when the type of sound being modeled had a very short articulation (e.g., click sounds).

When defining an HMM, the types of boundaries to use for each state can be selected. Using the example in FIG. 3, if the HMM includes only "out" boundaries, then "State X" and its "in" boundary state would be merged. The boundary state distributions are copied from the corresponding non-boundary state distribution, with the means of any stationarity features increased to capture the change in signal statistics when transitioning from one type of sound to another. In a preferred embodiment values of the initial state transition matrix are set to 0 to capture the state transition constraints in FIG. 3.

In step 220 of method 200, the HMM is trained to associate each step of the HMM to a determination of LSS or NLSS. Generally, the process of training an HMM refers to the process of determining the most-likely set of state transition and output probability parameters for a test dataset of observation sequences. In an embodiment the training input also includes a predefined mapping of states to labels.

An exemplary algorithm for training the HMM in a preferred embodiment is the Baum-Welsh HMM training algorithm. To avoid storage constraints, the Baum-Welsh algorithm preferably is modified so that it does not store the probability of each possible state transition at each possible instance of time, but re-computes it when needed. While this increases the running time of the training algorithms, it is an acceptable tradeoff for being able to train models with many states and train multiple models simultaneously on one computer. The implementation of the Baum-Welsh HMM training algorithms preferably uses multivariate, multimodal Gaussian observation densities with full covariance matrices. The Baum-Welsh algorithm in an embodiment preferably stops when the difference in the likelihood of the model given the data between successive iterations falls below a user-defined threshold. Also included is scaling of the forward and backward probabilities to avoid underflow and the detection and correction of near-zero probabilities to compensate for finite training sets.

An exemplary training algorithm for an HMM employs discriminative learning. Discriminative learning is an approach to machine learning where models are trained based on discriminating correct classifications of the training data from incorrect classifications. Discriminative learning is a form of supervised learning, and requires the user to specify a set of observation sequences as training samples along with a label sequence for each observation sequence which gives the correct label for each observation (e.g., "filled pause", "NLSS", or "language speech" depending on the label distinctions of interest).

An embodiment of a discriminative learning algorithm is based on the growth transformation (GT) framework, which is an optimization framework in which the value of a function of the model parameters, referred to as the objective function, is maximized. In the GT framework, new estimates of model parameters are computed as a function of current model parameters, and these new estimates are guaranteed to give an increase in the value of the objective function compared to the value obtained for the current model parameters, except when the maximum value obtained, in which case the value of the objective function is the same. This estimation procedure is iterated to obtain better and better estimates of the model parameters. This objective function can be adapted to different optimization criteria. Training algorithm 400 preferably uses maximum mutual information (MMI) optimization criteria which focus on maximizing the mutual information between labels and observations. Other embodiments of optimization criteria for a discriminative learning algorithm include minimum classification error (MCE), minimum phone error (MPE), and minimum word error (MWE). Other techniques known to those of skill in the art, such as gradient ascent or maximum margin, also can be used to train an HMM.

Figure 4:
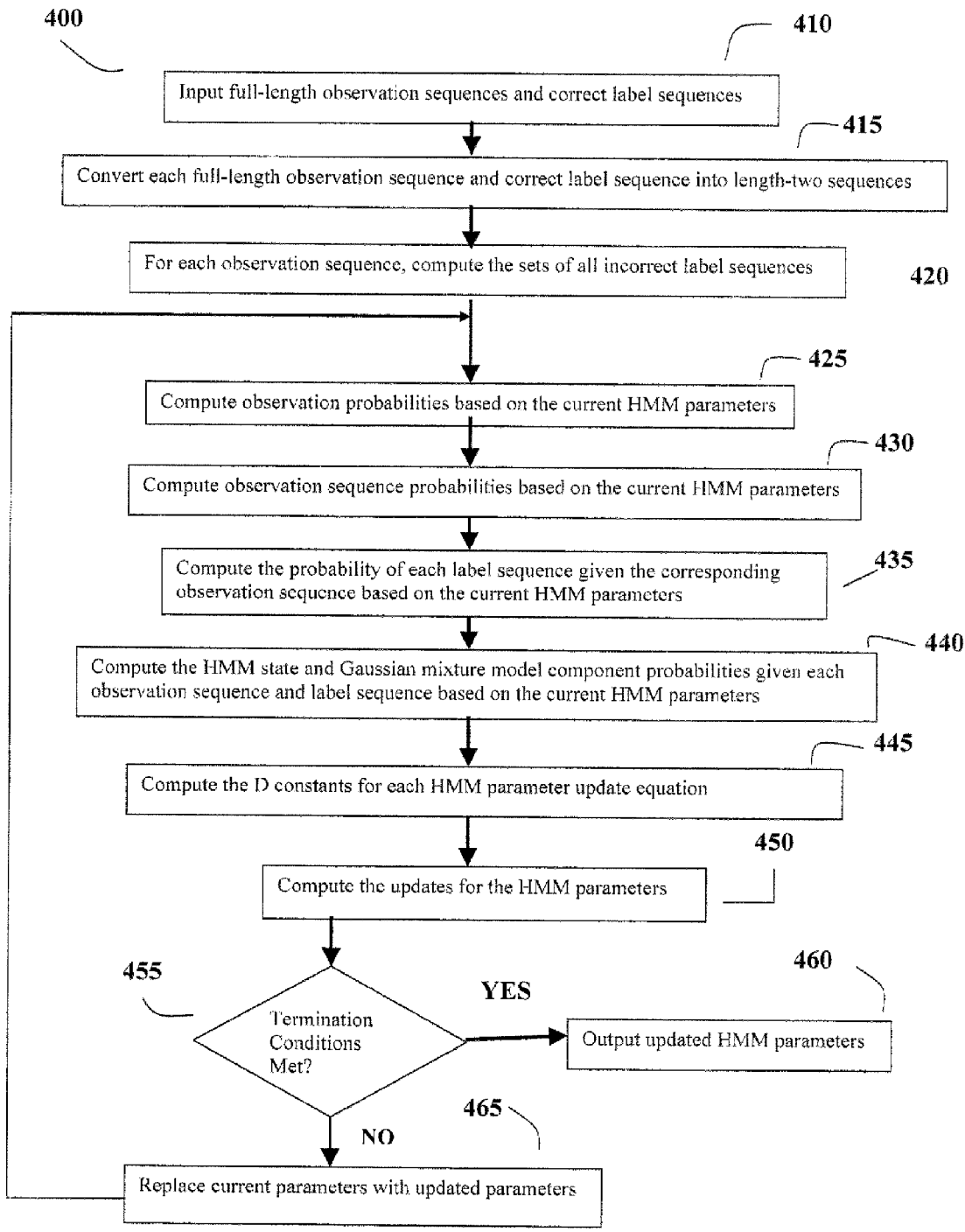
FIG. 4 shows the steps of an exemplary algorithm for training a hidden Markov model.

Training algorithm 400 depicted in FIG. 4 is an exemplary embodiment of a discriminative learning algorithm. Training algorithm 400 is based on an algorithm described by He, et al, in "Discriminative learning in sequential pattern recognition," IEEE Signal Processing Magazine, 25(5), pp. 14-36, September 2008, which is incorporated here by reference (hereafter "He2008"). However, the He algorithm is formulated to train left-to-right HMMs that model phonemes in speech, using a sequence of words as the label sequence for an observation sequence (a speech utterance). The word sequence specifies a sequence of phonemes, which is translated into a left-to-right HMM that is formed by concatenating the left-to-right HMMs used to model each phoneme in the sequence. By contrast, training algorithm 400 is adapted to train any kind of HMM, including but not limited to an ergodic HMM in which there is no pre-determined sequential ordering of HMM states. In this case, the label sequence for an observation sequence does not specify an HMM, it simply specifies information about each observation that is related to HMM states. In an embodiment of the training algorithm, there is a one-to-many relationship between labels and HMM states. Thus, a label for an observation indicates that the observation was generated from one of a set of HMM states that the user specifies to be mapped to that label. Each HMM state is mapped to exactly one label.

The inputs to training algorithm 400 are an initial set of HMM parameters, $\Lambda'$, a set of training observation sequences, and the set of correct label sequences for those observation sequences. In a preferred embodiment, the initial HMM parameters are computed from a small subset of the training data that has been labeled (preferably by a human) with one label per HMM state. This information can be used to compute estimates of the initial state probability parameters, state transition probability parameters, and HMM state observation distribution parameters. In the case that the multimodal Gaussian PDFs used for HMM state observation distributions have more than one mixture component, a clustering algorithm can be used to estimate the multimodal Gaussian PDFs parameters.

In step 410, the training dataset of training observation sequences is input, along with the correct label sequence corresponding to each training observation sequence. The observations used in the training algorithm are preferably the same type of observations as are used in the HMM in an embodiment, namely, features (or vectors of features) extracted or computed from the audio signal using for testing. Exemplary types of features used in an embodiment are described in more detail below in connection with step 240 and FIG. 2.

In step 415, each full length observation sequence and correct label sequence is converted into sets of length-two sequences to get the observation and label sequences for training. Training algorithm 400 involves the evaluation of all possible label sequences (correct and incorrect) to perform HMM training. Although the number of possible label sequences can be intractably large, it is possible to perform evaluation of all possible label sequences by reformulating the training observation sequences to be very small in length, preferably only 2 observations long. This is performed by taking all sequential pairs of observations from all original observation sequences and treating each pair as an observation sequence. Thus, an observation sequence with T observations can be converted into (T−1) observation sequences of length 2. Thus, for a size L label set, there are $(T-1)*L^2$ possible label sequences as opposed to $L^T$ possible label sequences for the full original observation sequence. This allows training to be tractable without sacrificing any information in the training data that is useful for training the HMM. In the case that the label set is too large to evaluate all possible label sequences, a subset of the best incorrect label sequences (most confusable with the correct label sequence) can be chosen.

In step 420, the set of all incorrect label sequences for each observation sequence is computed. This is performed by computing all possible pairs of labels, and for each observation sequence removing the pair of labels that is equivalent to the correct label sequence.

In step 425, the observation likelihoods are computed based on the current HMM parameters. Compute the value of the probability distribution for all observations for each HMM state distribution mixture component and for each HMM state.

In step 430, the observation sequence likelihoods, i.e., $p(x_r|\Lambda)$, where x is the set of all length-2 observation sequences and is indexed by r, are computed based on the current HMM parameters. For each input observation sequence, the likelihood of the input sequence given the current parameter set is computed. Methods for performing this are given in Rabiner, L. R. and Juang B. H., *Fundamentals of Speech Recognition*. Englewood Cliffs, N.J.: Prentice Hall, 1993, incorporated here by reference ("Rabiner 1993"), such as computing the forward probabilities for all observations and then summing the forward probabilities for each state and the last observation to get the likelihood of the input sequence given the current parameter set. An alternate method is to compute the forward probabilities with scaling factors for each observation and then multiplying all of the scaling factors together to get the likelihood of the input sequence given the current parameter set.

In step 435, the probability of each label sequence given the corresponding observation sequence is computed based on the current HMM parameters. Using the following equations, compute the label-dependent forward and backward probabilities for each input sequence and label sequences:

Let:
$x = x_1 \ldots x_T$ = an observation sequence
$s = s_1 \ldots s_T$ = a label sequence over the observations, such that $s_t$ is the label for observation t
$y_t$ = the HMM state at time t
I = the number of HMM states
$M_i$ = the number of modes (Gaussian mixture components) in the observation distribution for state i
$\Lambda$ = a set of HMM parameters
$b_i(x_t)$ = the likelihood of observation $x_t$ given HMM state i, computed by evaluating the observation probability distribution for state i for observation $x_t$
$\eta(i)$ = the user-defined mapping from HMM state i to a label; this mapping defines the probability of HMM states given labels:

$$p(s_t | y_{r,t} = i) = \delta(\eta(i), s_t) \quad (1)$$

where $\delta$ is the Kronecker delta function, such that $\delta(a, b) = 1$ if and only if $a = b$ and 0 otherwise. Label-dependent forward probabilities are defined as:

$$\alpha_t(i, x, s) = p(x_1 \ldots x_t, s_1 \ldots s_t, y_t = i | \Lambda) \quad (2)$$

The computation of these probabilities starts with the first observation as:

$$\alpha_1(i, x, s) = p(x_1, s_1, y_1 = i | \Lambda) = \pi_i \cdot \delta(s_1, \eta(i)) \cdot b_i(x_1) \quad (3)$$

where $\pi_i$ is the initial state probability for state i. All other label-dependent forward probabilities are computed recursively using:

$$\alpha_{t+1}(i, x, s) = p(x_1 \ldots x_{t+1}, s_1 \ldots s_{t+1}, y_{t+1} = i | \Lambda) = \quad (4)$$

$$\delta(s_{t+1}, \eta(i)) b_i(x_{t+1}) \sum_{j=1}^{I} \alpha_t(j, x, s) a_{ji}$$

where $\alpha_{ji}$, is the probability of transitioning from state j to state i and $\delta$ is the Kronecker delta function. The label-dependent backwards probabilities are defined as:

$$\beta_t(i, x, s) = p(x_{t+1} \ldots x_T, s_{t+1} \ldots s_T | y_t = i, \Lambda) \quad (5)$$

The computation of these probabilities starts with:

$$\beta_T(i, x, s) = 1 \quad (6)$$

All other label-dependent backwards probabilities are computed recursively as:

$$\beta_t(i, x, s) = p(x_{t+1} \ldots x_T, s_{t+1} \ldots s_T | y_t = i, \Lambda) = \quad (7)$$

$$\sum_{j=1}^{I} a_{ij} \beta_{t+1}(j, x, s) \delta(s_{t+1}, \eta(j)) b_j(x_{t+1})$$

Scaling factors are computed, as in the standard procedure for computing forward and backward probabilities found in Rabiner 1993. Here, the forward probabilities for each state are computed first, and scaled to sum to 1 for each observation. For each observation, the number that these probabilities are divided by is that scaling factor for that observation. The backward probabilities for each observation are then divided by the same scaling factor used for the same observation in the forward probability calculations.

The label-dependent forward and backward probabilities computed in step 435 are used to compute quantities for training algorithm 400 as follows.

Let:
$X = x_1 \ldots x_R$ = the set of R training observation sequences, such that each $x_r$ contains $T_r$ observations: $x_r = x_{r,1} \ldots x_{r,T_r}$, and the number of total observations is $$T = \sum_{r=1}^{R} T_r$$

$s_r = \{s_r^{(n)} | n = 1 \ldots N_r\}$ = the set of all possible labelings of observation sequence $x_r$, such that $|s_r| = N_r = L^{T_r}$, where L is the number of labels in the label set.
$s_r^{(n)}$ = the labels for observation sequence $x_r$ specified by element n of $s_r$.

$$p(s_r^{(n)} | x_r, \Lambda) = \frac{p(x_r, s_r^{(n)} | \Lambda)}{p(x_r | \Lambda)} \quad (8)$$

In equation (8), the denominator on the right-hand side is computed using the standard forward-backward procedure as described in Rabiner 1993. The numerator is computed by the product of the scaling factors, if used, or from:

$$p(x_r, s_r^{(n)} | \Lambda) = \sum_{i=1}^{I} \alpha_{T_r}(i, x_r, s_r^{(n)}) \quad (9)$$

Continuing with step 435, compute $p(s_r^{(n)} | x_r, \Lambda')$, meaning, for each label sequence and corresponding observation sequence, use the label-dependent forward and backward probabilities and the results of Step 430 to compute:

$$p(s_r^{(n)} | x_r, \Lambda') = \frac{p(s_r^{(n)}, x_r | \Lambda')}{p(x_r | \Lambda')} \quad (10)$$

using the label-dependent forward and backward probabilities and the results of Step 430.

In step 440, the HMM state and Gaussian mixture model component probabilities are computed given each observation sequence and the label sequence based on the current HMM probabilities.

The computations in step 440 preferably use the following computations.

Let:
$y_{r,t}$ = the HMM state at time t for observation sequence r
$z_{r,t}$ = the Gaussian mixture component index at time t for observation sequence r
$b_{im}(x_{r,t})$ = the likelihood of observation $x_{r,t}$ given Gaussian mixture component m of HMM state i, computed by evaluating component m (a unimodal Gaussian distribution) of the observation probability distribution for state i for observation $x_{r,t}$ The probability of an HMM state given an observation and label sequence, $p(y_{r,t}=i|s_r^{(n)}, x_r, \Lambda)$, is computed using:

$$p(y_{r,t} = i \mid s_r^{(n)}, x_r, \Lambda) = \frac{p(s_r^{(n)}, x_r, y_{r,t} = i \mid \Lambda)}{p(s_r^{(n)}, x_r \mid \Lambda)} \quad (11)$$

$$= \frac{p(s_r^{(n)}, x_r, y_{r,t} = i \mid \Lambda)}{\sum_{j=1}^{I} p(s_r^{(n)}, x_r, y_{r,t} = j \mid \Lambda)}$$

where the sum in the denominator is used to match scaling factors in the numerator and:

$$p(s_r^{(n)}, x_r, y_{r,t}=i|\Lambda) = \alpha_t(i, x_r, s_r^{(n)}) \beta_t(i, x_r, s_r^{(n)}) \quad (12)$$

The probability of an HMM state and Gaussian mixture component given an observation and label sequence, $p(y_{r,t}=i, z_{r,t}=m|s_r^{(n)}, x_r, \Lambda')$, is computed using:

$$p(y_{r,t}=i, z_{r,t}=m|s_r^{(n)}, x_r, \Lambda') = p(y_{r,t}=i, | s_r^{(n)}, x_r, \Lambda')$$
$$p(z_{r,t}=m|y_{r,t}=i, s_r^{(n)}, x_r, \Lambda') = p(y_{r,t}=i, | s_r^{(n)}, x_r, \Lambda') p$$
$$(z_{r,t}=m|y_{r,t}=i, x_{r,t}, \Lambda')$$

The first term is computed using equation (11) and:

$$p(z_{r,t} = m \mid y_{r,t} = i, x_{r,t}, \Lambda') = \frac{w_{im} b_{im}(x_{r,t})}{\sum_{l=1}^{M_i} w_{il} b_{il}(x_{r,t})} \quad (14)$$

where $w_{im}$, is the mth mixture component weight of the observation distribution in state i. The probability of HMM state pairs given an observation and label sequence, $p(y_{r,t-1}=i, y_{r,t}=j|s_r^{(n)}, x_r, \Lambda')$, is computed using:

$$p(y_{r,t-1} = i, y_{r,t} = j \mid s_r^{(n)}, x_r, \Lambda') = \quad (15)$$

$$\frac{p(s_r^{(n)}, x_r, y_{r,t-1} = i, y_{r,t} = j \mid \Lambda')}{p(s_r^{(n)}, x_r \mid \Lambda')} =$$

$$\frac{p(s_r^{(n)}, x_r, y_{r,t-1} = i, y_{r,t} = j \mid \Lambda')}{\sum_{k=1}^{I} \sum_{l=1}^{I} p(s_r^{(n)}, x_r, y_{r,t-1} = k, y_{r,t} = l \mid \Lambda')}$$

where the sums in the denominator are used to match scaling factors in the numerator and:

$$p(s_r^{(n)}, x_r, y_{r,t-1}=i, y_{r,t}=j|\Lambda') = \alpha_{t-1}(i, x_r, s_r^{(n)}) a_{ij} \delta(s_{r,t}^{(n)}, \eta(j)) b_j(x_{r,t}) \beta_t(j, x_r, s_r^{(n)}) \quad (16)$$

where $\delta$ is the Kronecker delta function.

Using the results of step 435 and the previous computations of equation (13) in step 440, for all values of i, m, r, and t, compute $\gamma_{i,m,r,t}^{den}$:

$$\gamma_{i,m,r,t}^{den} = \sum_n p(s_r^{(n)} \mid x_r, \Lambda') p(y_{r,y}=i, z_{r,t}=m \mid s_r^{(n)}, x_r, \Lambda') \quad (17)$$

Using the results of step 435 and the previous computations of equation (11) in step 440, for all values of i and r compute $\phi_{i,r}^{den}$:

$$\varphi_{i,r}^{den} = \sum_n p(s_r^{(n)} \mid x_r, \Lambda') p(y_{r,1}=i \mid s_r^{(n)}, x_r, \Lambda') \quad (18)$$

Using the results of step 435 and the previous computations of equation (43) in step 440, for all values of i, j, r, and t, compute $\xi_{i,j,r,t}^{den}$:

$$\xi_{i,j,r,t}^{den} = \sum_n p(s_r^{(n)} \mid x_r, \Lambda') p(y_{r,t-1}=i, y_{r,t}=j \mid s_r^{(n)}, x_r, \Lambda') \quad (19)$$

In part 2 of step 440, compute $\Delta\tilde{\phi}_{i,r}$, $\Delta\tilde{\gamma}_{i,m,r,t}$, and $\Delta\tilde{\xi}_{i,j,r,t}$ Let:
$S_r^*$=the correct label sequence for observation sequence $x_r$.
For all values of i, m, r, and t, using the results of part 1 of step 440, compute:

$$\Delta\tilde{\gamma}_{i,m,r,t} = p(y_{r,t}=i, z_{r,t}=m|S_r^*, x_r, \Lambda') - \gamma_{i,m,r,t}^{den} \quad (20)$$

For all values of i and r, using the results of part 1 of step 440, compute:

$$\Delta\tilde{\phi}_{i,r} = p(y_{r,1}=i|S_r^*, x_r, \Lambda') - \phi_{i,r}^{den} \quad (21)$$

For all values of id, r, and t, using the results of part 1 of step 440, compute:

$$\Delta\tilde{\xi}_{i,j,r,t} = p(y_{r,t-1}=i, y_{r,t}=j|S_r^*, x_r, \Lambda') - \xi_{i,j,r,t}^{den} \quad (22)$$

In step 445, several sum terms and the D constants for each HMM parameter update equation are computed.
Let:
$x_{r,t,k}$=feature k of observation t in observation sequence r
The following sum terms are computed:

$$y_{i,m} = \sum_{r=1}^{R} \sum_{t=1}^{T_r} \Delta\tilde{\gamma}_{i,m,r,t} \quad (23)$$

$$v_{i,m,k} = \sum_{r=1}^{R} \sum_{t=1}^{T_r} \Delta\tilde{\gamma}_{i,m,r,t} x_{r,t,k} \quad (24)$$

$$z_{i,m,k} = \sum_{r=1}^{R} \sum_{t=1}^{T_r} \Delta\tilde{\gamma}_{i,m,r,t} x_{r,t,k}^2 \quad (25)$$

$$\gamma_{i,m}^{den} = \sum_{r=1}^{R} \sum_{t=1}^{T_r} \gamma_{i,m,r,t}^{den} \quad (26)$$

$$\xi_{i,j}^{den} = \sum_{r=1}^{R} \sum_{t=1}^{T_r} \xi_{i,j,r,t}^{den} \quad (27)$$

$$\varphi_i^{den} = \sum_{r=1}^{R} \varphi_{i,r}^{den} \quad (28)$$

Using the foregoing sum terms, the D constants for each HMM parameter are computed:

$$\hat{D}_{i,m}^b = \max(E^*\gamma_{i,m}^{den}, 2D_{i,m}^{min}) \quad (29)$$

where:

$$D_{i,m}^{min} = \max_k \hat{D}_{i,m,k} \quad (30)$$

E is a user-defined constant greater than or equal to 1 (preferably, equal to 1) and $\hat{D}_{i,m,k}$ is the larger real root of the quadratic equation:

$$\hat{D}_{i,m,k}^2 \sigma_{imkk}'^2 + \hat{D}_{i,m,k}(z_{i,m,k} - 2\mu_{imk}'v_{i,m,k} + (\sigma_{imkk}'^2 + \mu_{imk}'^2)y_{i,m}) + y_{i,m}z_{i,m,k} - v_{i,m,k}^2 = 0 \quad (31)$$

If no real root exists for equation (31) for any values of i, m, and k, the corresponding $\hat{D}_{i,m,k}$ is not considered in equation (30).

$$\hat{D}_i^w = E^w \cdot \max_m \left( \frac{\gamma_{i,m}^{den}}{w_{im}'} \right) \quad (32)$$

$$\hat{D}_i^a = E^a \cdot \max_j \left( \frac{\xi_{i,j}^{den}}{a_{ij}'} \right) \quad (33)$$

$$\hat{D}^\pi = E^\pi \cdot \max_i \left( \frac{\varphi_i^{den}}{\pi_i'} \right) \quad (34)$$

where $E^w$, $E^a$, and $E^\pi$ are user-specified constants greater than 1. These constants are preferably set to 2.0, however users may increase or decrease this value to achieve more stable training or faster training convergence, respectively.

The discriminative learning algorithm is formulated as update equations for HMM parameters, a set of equations for updates to each parameter in terms of the training data (observation sequences and label sequences), the current estimate of the parameter, and the constant D. In step 450, the parameter estimate updates for all $\pi_1$, $\alpha_{ij}$, $w_{im}$, $\mu_{imk}$ and $\sigma_{imkl}$ are computed according to the following (and using the parameters defined previously):

$$\pi_i = \frac{\sum_{r=1}^{R} \Delta \tilde{\varphi}_{i,r} + \pi_i' \hat{D}^\pi}{\sum_{k=1}^{I} \sum_{r=1}^{R} \Delta \tilde{\varphi}_{k,r} + \hat{D}^\pi} \quad (35)$$

$$a_{ij} = \frac{\sum_{r=1}^{R} \sum_{t=2}^{T_r} \Delta \tilde{\xi}_{i,j,r,t} + a_{ij}' \hat{D}_i^a}{\sum_{k=1}^{I} \sum_{r=1}^{R} \sum_{t=2}^{T_r} \Delta \tilde{\xi}_{i,k,r,t} + \hat{D}_i^a} \quad (36)$$

$$w_{im} = \frac{\sum_{r=1}^{R} \sum_{t=1}^{T_r} \Delta \tilde{\gamma}_{i,m,r,t} + w_{im}' \hat{D}_i^w}{\sum_{k=1}^{M_j} \sum_{r=1}^{R} \sum_{t=1}^{T_r} \Delta \tilde{\gamma}_{i,k,r,t} + \hat{D}_i^w} \quad (37)$$

$$= \frac{y_{i,m} + w_{im}' \hat{D}_i^w}{\sum_{k=1}^{M_j} y_{i,k} + \hat{D}_i^w}$$

$$\mu_{imk} = \frac{\sum_{r=1}^{R} \sum_{t=1}^{T_r} \Delta \gamma_{i,m,r,t} x_{r,t,k} + \mu_{imk}' \hat{D}_{i,m}^b}{\sum_{r=1}^{R} \sum_{t=1}^{T_r} \Delta \gamma_{i,m,r,t} + \hat{D}_{i,m}^b} \quad (38)$$

$$= \frac{v_{i,m,k} + \mu_{imk}' \hat{D}_{i,m}^b}{y_{i,m} + \hat{D}_{i,m}^b}$$

$$\sigma_{imkl} = \frac{\sum_{r=1}^{R} \sum_{t=1}^{T_r} \Delta \gamma_{i,m,r,t}(x_{r,t,k} - \mu_{imk})(x_{r,t,l} - \mu_{iml}) + \hat{D}_{i,m}^b(\sigma_{imkl}' + (\mu_{imk}' - \mu_{imk})(\mu_{iml}' - \mu_{iml}))}{\sum_{r=1}^{R} \sum_{t=1}^{T_r} \Delta \gamma_{i,m,r,t} + \hat{D}_{i,m}^b} \quad (39)$$

where a prime (') after an HMM parameter indicates the previous estimate of that parameter. Note that the values for $\Sigma_{im}$ are computed using $\mu_{im}$, and so the $\mu_{im}$ parameter updates must be computed first.

Another difference in the formulation of the discriminative learning algorithm for speech recognition by He2008 and training algorithm 400 comes in the computation of the probabilities of HMM states and mixture components given observation and label sequences in equations (11) through (16). He2008 indicates that the quantities $p(y_{r,t}=i, z_{r,t}=m|x_r, s_r^{(n)}, \Lambda')$ in equation (13) and $p(y_{r,t-1}=i, y_{r,t}=j|x_r, s_r^{(n)}, \Lambda')$ in equation (15) can be computed using standard forward and backward HMM probabilities as shown in Rabiner 1993. This is because the label sequence $s_r^{(n)}$ specifies the HMM that is used in this evaluation and so the HMM states are only dependent on this information through the structure of the HMM. With respect to training algorithm 400, however, the HMM structure is fully specified by $\Lambda'$ and the HMM states are dependent on the label sequence by the fact that the labels indicate which HMM states are possible for each observation. Thus, computation of these probabilities requires a modification of the standard forward and backward HMM probabilities, as indicated above.

In step 455, after each iteration of this algorithm, stopping conditions are evaluated to determine whether to stop training or to set $\Lambda'=\Lambda$ and repeat. Example stopping conditions include reaching a user-defined number of training iterations. Stopping conditions for the exemplary discriminative learning algorithm can include when the difference in model parameters between successive iterations falls below a user-defined threshold. If the stopping conditions are not met, the current HMM parameters are updated and the process starts over with step 425 with the next observation sequence in the training dataset. Otherwise, the HMM parameter updates are output to establish the HMM used in the remaining steps of method 200.

The training algorithms described here preferably are implemented as a UIMA pipeline component. (UIMA refers to Apache's Unstructured Information Management Architecture, which is described in more detail below.) The UIMA architecture allows the user to specify the HMM initial conditions and conditions for stopping HMM training as described above.

It may be desirable in an embodiment (especially in terms of memory efficiency) to only update the HMM state observation distribution parameters. In this case, only the computations required to compute equations (37), (38), and (39) need to be executed.

The HMM is trained to classify observations using a set of labels which indicate the types of sounds to be distinguished. Training an HMM for detecting NLSS is an exemplary application of training algorithm 400. In an exemplary embodiment, for example, the HMM is trained to associate each state of the HMM to a determination of LSS or NLSS. In another exemplary embodiment, the HMM can be trained to distinguish between filled pauses and all other speech sounds; and in yet another embodiment the HMM can be trained to distinguish between silence, language speech, "ah," filled pause, cough, laugh, lipsmack, microphone, background speech, noise, and breath. Training an HMM with discriminative learning as described here allows the HMM to be trained efficiently with a mixture of supervised and unsupervised learning. The user labels only the phenomena to be detected in the training data; this allows the algorithm to create a model that is specifically trained to discriminate between the phenomena to detect and all other phenomena in the data. Simultaneously, the part of the model that covers the "other" phenomena is trained to form an accurate representation of this phenomena, without the need for labels to distinguish the different kinds of phenomena that may be present.

After it has been trained (step 220 in FIG. 2), the HMM can be used to classify speech sounds captured in a recording or other audio signals. In step 230, segments of the speech signal are isolated (or extracted) for further processing. The term segment (or frame) specifies how often feature vectors are computed from the raw input (preferably, every 10 ms). The windows used over the raw input specify the number of raw input samples used to compute a feature, which are allowed to go beyond the 10 ms segment/frame. So, even though a frame may span the input from time 40 ms-50 ms, the actual samples used to compute that frame's feature may span 25 ms-65 ms. The extracted features are combined into a feature vector, and the feature vectors form the observations used by the HMM. All features associated with a single segment form one observation; a sequence of observations is obtained from a temporal sequence of segments.

In step 240 of method 200 (FIG. 2), one or more features are extracted from the segments. Preferably, the same set of features are extracted from each segment of the speech signal. An embodiment utilizes a small set of features that are useful in discriminating NLSS from LSS. This feature set preferably comprises cepstral coefficients, pitch confidence, cepstral variance, and cepstral stationarity. The features are obtained using publicly-available signal processing tools, for example, front end signal processing libraries from Carnegie Mellon University's Sphinx-4 project, which provide spectral feature computation for speech data using a pipeline of configurable signal processing components. These features preferably are used with each other, but can also be used with one or more other non-language signs, including signal energy, zero-crossing rates, spectral entropy, entropy of Fourier transfer coefficients, wavelet coefficient variance, cross-correlation and auto-correlation, duration of utterances or pauses, pitch contour, pitch fundamental frequency transition, and spectral envelop deformation.

Cepstral Coefficients. Mel-frequency cepstral coefficients (MFCCs) are used to capture the short-time frequency-domain information of the input signal. Nearly all approaches to speech processing involve the conversion of time-domain audio samples to a frequency-domain representation, which captures the strength of the speech signal at various frequencies. Mel-frequency cepstral coefficients (MFCCs) are a representation of the frequency-domain information that have been used successfully in many speech processing applications.

MFCCs are computed using homomorphic filtering techniques, in which an inverse Fourier transform is applied to the log of the input spectrum. This has the effect of deconvolving the excitation of the speech signal and the impulse response of the vocal tract. In order to mimic the human auditory system, a set of mel-scale filter banks are used when computing the log of the input spectrum. The computation of MFCCs preferably uses a discrete cosine transform (DCT) in place of the inverse Fourier transform above. In the preferred implementation, MFCCs are computed over a window of length 410 samples for input audio with an 8 kHz sampling rate, giving a window size of 25.625 ms. This window length is derived from the amount of resolution and range that is desired over the frequency spectrum. The computation of MFCCs provides the added benefit that signal energy is captured by the $0^{th}$ MFCC, which can be a valuable feature in speech detection. A preferred embodiment uses thirteen (13) coefficients and employs normalization of the energy component ($0^{th}$ MFCC) to account for differing signal levels between speakers as well as cepstral mean normalization to reduce the effects of background noise.

Cepstral mean normalization is used to improve the robustness of the MFCC features. Cepstral mean normalization is a straightforward approach to improve the signal to noise ratio (SNR) of a system. It makes use of the assumption that the noise mean in any given cepstral band is relatively constant and that speech provides greater variation. The cepstral mean normalization algorithm computes the average of the cepstral coefficients for a window of N previous audio segments and subtracts this value from the MFCCs of the current audio segment, as follows:

$$x_k[n] = y_k[n] - \frac{1}{N}\sum_{i=0}^{N-1} y_k[n-i] \quad (40)$$

where $y_k[n]$ is MFCC k of the input cepstrum at time n and $x_k[n]$ is coefficient k of the estimated "speech" signal at time n. A standard value used for N is 100 segments. Cepstral mean normalization helps reduce the effects of some unknown linear filtering, and helps reduce the effects of some additive noise on the system, but does not fully address high frequency noise components.

Pitch Confidence. In a preferred embodiment, an autocorrelation-based algorithm is used to compute pitch confidence. The presence of voicing in an audio recording can be a valuable feature in speech detection. As well, changes in the pitch period can be an indication of a backchannel or filled pause sound. Thus, a preferred embodiment implements pitch detection and estimation, which is expected to help detect NLSS such as breaths, coughs, and clicks, which are not produced with voicing. An autocorrelation-based algorithm is implemented, as follows. First, the raw input audio signal is split into frames using a Hamming window. In each window, a three-level clip is applied to the input signal, which removes low-amplitude energy that might make autocorrelation peaks less distinct. Then, autocorrelation values (autocorr) are computed as:

$$autocorr[i] = \sum_{j=0}^{n-i-1} x[j] * x[j+i] \quad (41)$$

where x is now the windowed raw input signal, x[j] is the value of sample j in the window, n is the number of samples in the window, and "*" is multiplication. Next is the employment of a simple peak finding algorithm, which takes the maximum value between an autocorrelation delay that corresponds to a range of possible frequencies. This maximum value is taken to be the estimate of the pitch fundamental frequency (F0). The presence of voiced speech is estimated using a pitch confidence score. This confidence score is computed as the distance of the peak above the average autocorrelation amplitude, normalized by the zero-delay autocorrelation value. If the peak is outside of a pair of user-specifiable high and low frequencies, a value of zero is returned for F0, as it is not an expected pitch value. Typical high and low frequencies values are 300 Hz and 80 Hz, respectively.

Cepstral Stationarity. Cepstral stationarity features can be used to measure the dynamics of the cepstrum of the signal. Human speech is notoriously non-stationary, which means that the statistics of the signal vary with time. Ordinarily, this phenomenon creates challenges for many speech processing applications. However, many NLSS such as coughs, breaths, and filled pauses (e.g. "ah", "um") have a longer duration of articulation than the LSS that they similar to. For example, consider a breathy sigh compared to the pronunciation of "h" in the word "hat". Cepstral stationarity features can be computed in an attempt to capture this extended duration. An embodiment uses the magnitude of variation in the cepstral stationarity features. Thus, cepstral stationarity is computed on a window over the sequence of MFCC values using standard deviation computations. The stationarity of each coefficient is then aggregated into a single value by taking the average of all coefficients' stationarities.

Several different methods can be used compute stationarity measurements, including prediction error, standard deviation, range, and the difference between MFCCs computed using two window sizes. In the following equations, the expression $mfcc_i[m]$ means the $i^{th}$ MFCC value from segment m. The prediction error (e) of MFCC i from segment n for window size k is computed as:

$$e_i[n] = mfcc_i[n] - \frac{1}{k-1}\sum_{m=n-k}^{n-1} mfcc_i[m] \quad (42)$$

The range (range) for each MFCC i from segment n for window size k is computed as $$range_i[n] = \max_{m=n-j \ldots n+j} mfcc_i[m] - \min_{m=n-j \ldots n+j} mfcc_i[m] \quad (43)$$

where j=(k−1)/2.

An embodiment includes an algorithm to compute stationarity measurements based on the standard deviation of MFCC values over a window of speech frames. The standard deviation (stdev) of MFCC i in frame n for window size k is computed as:

$$stdev_i[n] = \sqrt{\sum_{m=n-j}^{n+j}\left(mfcc_i[m] - \frac{1}{k}\sum_{m=n-j}^{n+j} mfcc_i[m]\right)^2} \quad (44)$$

where j=(k−1)/2. The window size k refers to the number of neighboring segments used to compute stationarity, and is required to be an odd number so that j is an integer.

Another method used to compute stationarity in a preferred embodiment uses a second set of MFCCs computed over a long window size, preferably 5 times as long as the window used to compute the original MFCCs. These MFCCs capture the frequency information of a larger window on the audio signal. For each MFCC, there is a long-window MFCC and a regular-window MFCC with the same window center, and the absolute value of the difference between the long-window MFCC and the regular-window MFCC is computed to capture the degree to which the signal statistics are changing.

To provide a more compact representation of stationarity in a preferred embodiment, the stationarity of the MFCCs can be aggregated by taking the average and maximum stationarity of MFCCs 1-12. The $0^{th}$ MFCC preferably is not used here because it represents signal energy, not the energy in a particular part of the cepstrum.

Cepstral Variance. The cepstral variance feature can be used to measure the distribution of signal energy in the MFCC coefficients. In order to produce a variety of phonetic sounds, the human vocal tract must be able to distribute acoustic spectral energy in a variety of ways. The result of this is that most phonetic speech sounds distribute signal energy unevenly in the spectrum. Thus, the MFCCs associated with language speech sounds should display a greater degree of variation amongst their values than most non-speech sounds. As well, certain types of human produced NLSS like coughs and breaths, which are articulated with an open vocal tract, may also show lower variation in their MFCC values.

Several different methods are available to compute features to capture cepstral variation: an entropy measure, standard deviation, and range in the MFCC values for a single speech frame. The entropy (ent) of the MFCCs from segment n is computed as:

$$ent[n] = \sum_{i=1}^{n-1} p_i[n]\log(p_i[n]) \quad (45)$$

where $$p_i[n] = mfcc_i[n] / \sum_{j=1}^{n-1} mfcc_j[n] \quad (46)$$

An embodiment captures cepstral variation using the standard deviation. The standard deviation and range are computed similar to the stationarity, except that the values used are MFCCs 1 through 12 from the same frame instead of the same MFCCs from neighboring frames. The $0^{th}$ MFCC preferably is not included in the cepstral variance computations because it captures signal energy, not energy in a specific part of the spectrum.

In step 240 of method 200 (FIG. 2), the raw speech signal is transformed into a sequence of feature vectors (an observation sequence) using the same method used for training. Segments are formed over the input signal and feature vectors are computed for each segment. An embodiment of an HMM for detecting NLSS used 26 states (including boundary states) and the feature set consisted of 13 MFCC values, pitch confidence, the standard deviation cepstral variation value, and two standard deviation cepstral stationarity values using window sizes of 3 and 9. The following labels were used to initialize the state distributions: silence, language speech, "ah" (filled pause sound), cough, laugh, lipsmack, microphone, background speech, noise, and breath, plus boundary states for each of these except for lipsmack and microphone states (which are short in duration). Cepstral mean normalization was used, and the MFCCs were modified after the stationarity features were computed using the MFCCs. This sequence of feature vectors is then processed in step 250 of method 200 using the trained HMM to compute the likelihoods of each HMM state for each feature vector (observation). The likelihoods and predefined mapping of HMM states to labels is used to determine the proper label for each segment (classification).

Adaptation of the trained HMM can be optionally employed in an embodiment to improve robustness to speaker, channel, and language variation. Preferably model adaptation occurs in step 255, immediately prior to classification. Model adaptation is accomplished by applying the Baum-Welsh parameter re-estimation algorithm using only the input speech signal that is to be classified. The use of model adaptation can be risky in that the semantics of the model, which govern the state-to-label mapping, may change during adaptation in an unpredictable way. To ensure that the state-to-label mapping remains valid during adaptation, the number of iterations of the Baum-Welsh parameter re-estimation algorithm can be limited and limits can be imposed on the amount to which the HMM state observation mean vector parameters can change, in terms of a specified number of standard deviations for each value of the mean vector. In some cases, better performance results from modifying only the HMM state observation mean vector parameters during adaptation, since the variation in speaker conditions manifests itself as differences in the average values for the types of sounds being modeled, while the distribution covariance values and state transition probabilities are expected to be similar for all speakers. An added benefit of adapting only a subset of the HMM parameters is that less processing time is required. Once this adaptation of the trained HMM has been performed, the resulting HMM is used to classify only the input audio signal that was used to compute the adapted HMM. After classification, the adapted HMM is discarded and the original trained HMM is used to classify (with adaptation, if desired) additional input audio signals.

In step 260, the segment is labeled as LSS or a NLSS based on the HMM state associated with the segment. Given a mapping of HMM states to labels, there are at least two different ways, in an embodiment, to use the HMM to classify a segment. In one such embodiment, the Viterbi algorithm is used to determine the most likely state to have generated each observation in an observation sequence (sequence of frames). The output of the algorithm will be the one state that each audio frame most probably corresponds to, and this state will correspond to a label using the known mapping of states to labels. Another embodiment performs the classification during post-processing (step 270) by computing the likelihood, given the whole observation sequence, that each HMM state generated the observation. The label for each observation is then computed from these HMM state likelihoods, using maximum likelihood selection or detection threshold and the HMM state to label mapping. The application of a detection threshold is described in more detail below. The user can specify which classification method to use.

In an embodiment the classification can be enhanced through post-processing procedures (step 270), including applying a language speech detection threshold, enforcing a minimum duration on language speech sounds, and attempting to detect filled pause sounds using changes in pitch fundamental frequency (F0).

The language speech detection threshold is used to convert a vector of HMM state probabilities for each segment to the desired label classes (e.g., language speech and non-language speech labels). For each segment, the probability that the segment belongs to each different HMM state is computed. The probabilities of all states sum up to 1 for each segment. In this embodiment no determination has been made about which HMM state is the correct one, and the detection threshold is used to make this determination. This is done by summing the probabilities for each state that map to the label to be detected and comparing the result to the detection threshold: if the probability is above the detection threshold, that segment is assigned the label in question; otherwise it is given some other label. Preferably the detection threshold is user-specified and modifiable.

Durational constraints can be used to impose a minimum duration on language speech sounds. This corrects errors made in classifying short-duration non-language sounds as language speech. For this task, the post-processing component uses two parameters (specified by the user): a minimum duration of language speech and a maximum gap between language speech sounds. Both of these durations are in terms of the number of consecutive audio segments of the preferred segment size. The first parameter (minimum duration of language speech) is used to detect language speech segment sequences that have length less than this duration and re-classify them as non-language sounds. The second parameter (maximum language speech gap) is used to prevent plosive phonemes at the end of utterances from being re-classified incorrectly. Plosives (also called "stops") are characterized by an initial close of the vocal tract followed by a burst of signal energy when the vocal tract is opened. This results in a period of silence (when the vocal tract is closed) followed by a short duration of language speech. In most cases, this duration will be less than the minimum duration for language speech. The maximum language speech gap parameter is used as the maximum number of non-language speech segments that can occur between two sequences of language speech such that the second sequence does not have to meet the minimum language speech duration constraint.

An embodiment can use a post-processing component to detect filled pause sounds (in particular, "ah" sounds) using changes in pitch F0 (fundamental frequency). One challenge to detecting filled pause sounds using changes is F0 is that sharp changes in F0 are rarely observed, and are more likely to be due to errors in F0 detection than filled pause sounds. Thus filled pause sound detection preferably requires finding sections of voiced speech (several F0 measurements long, where F0 is estimated for every segment) where the average F0 value is less than the average F0 of some previous section of voiced speech. An exemplary filled pause sound detection component uses HMM classifications of the audio segments to group the segments. The average F0 of these groups is used to perform the filled pause sound detection. The pitch confidence feature for each segment is thresholded to determine if the F0 measurement is valid. It is preferable to correct for some errors in F0 estimation where the first harmonic of F0 is returned as the estimate instead of F0. Preferably, only states of the HMM that are known to correspond to vowels are used. The conditions that must be met to detect a filled pause sound are: 1) the number of valid F0 measurements for this group must be above a certain threshold, 2) the change in average F0 between this group of segments and the previous group of segments must be above a threshold, 3) the number of segments separating this group and the previous group must be below a certain threshold. If only condition 1 is met, then this group is considered to be language speech, and so the average F0 is recorded for comparing future groups in condition 2. The thresholds used in these three conditions as well as the threshold used for the pitch confidence are all user-specified parameters of this component.

The classification is preferably output by the system. The classification can be outputted directly from the HMM or the post-processing component can convert HMM output to classification.

The system 100, including the hidden Markov model 150, is realized on a conventional desktop computer system with a 2 GHz Intel processor and 2 GB of RAM. The instructions expressing the methods and algorithms described herein are stored in computer-readable media on the desktop computer and executed by the Intel processor. The instructions were programmed in Java software using several software tools, including Apache's Unstructured Information Management Architecture (UIMA), an open-source tool for developing analysis pipelines. This tool provides the framework for creating analysis pipelines from modular components, controlling the storage of data and how each component adds information to the analysis. Also used are the front end signal processing components of Sphinx-4 (open source speech recognition engine software), which can be obtained at http://cmusphinx.sourceforge.net/sphinx4/. Implementation of the specific HMM algorithms and procedures described here is well within the knowledge and ability of one of ordinary skill in the art.

The process of creating an analysis pipeline in UIMA begins with the definition of a type system, which specifies the format of the data to be created, stored, and reused within the analysis pipeline. This type system is defined by a file in extensible markup language (XML) format and the types defined are automatically converted into a set of Java classes by built-in UIMA functions. The following sections describe the UIMA type system used in a preferred embodiment.

AnalysisMetadata. Each audio file to be processed uses one AnalyisMetaData type to store information about the audio analysis. This type specifies the rate at which features are computed for an audio file, and the list of feature types generated by the analysis.

AudioFileMetaData. Each audio file to be processed uses one AudioFileMetaData type to store information about how the audio data is stored in the file. This type specifies the audio sample frequency, the number of samples in the file, the number of bytes used to store each audio sample, and the endianess of the sample data.

Segment. This type is used to represent a segment of audio data, for which a set of features is computed. The number of Segments used by an audio file is determined by the rate at which features are computed (specified by the AnalysisMetaData type) and the length of the file (specified by the AudioFileMetaData type). Each Segment associated with an audio file contains an array of features. As well, each Segment stores a number indicating its position in the audio file, which is used to sequentially retrieve all Segments from an audio file.

The Feature types used in a preferred embodiment include the following:

MFCC: This type stores the mel-frequency cepstral coefficients (MFCCs) using an array of double-precision numbers.

Pitch: This type stores pitch information, which consists of a pitch confidence score that indicates the confidence that voiced speech is present and an estimate of the fundamental frequency (f0) of the pitch.

Stationarity: This type stores stationarity features, which capture the variation of the signal's frequency domain information in time.

Cepstral Variance: This type stores cepstral variation features, which capture the distribution of the frequency domain information in the MFCCs of a single segment of audio.

StateProbs: This type stores information about the probability that a segment was generated by each HMM state.

LSSLabel: This type stores the binary language speech sound/non-language speech sound label for a segment.

FIG. 1 shows the exemplary components of system 100. Speech samples and audio signals for training and evaluation are saved in audio files stored in persistent media 101.

System 100 includes a pre-processor 105 for reading and segmenting the audio signal. Pre-processor 105 in an embodiment includes AudioFileCollectionReader (110), which is responsible for creating a list of the files to be processed and initializing the AnalysisFileMetaData and AudioFileMetaData types for each file. The user-specified parameters for this component include: the directory in the file system where the audio files are stored, the sample frequency used in the audio files, the number of bytes used to store each audio sample, the endianness of the data used to store audio samples, the size of an audio segment in terms of the number of samples, and a list of the feature types to be generated by the analysis pipeline. Segmenter (115) implements the creation of the Segment data structures for each audio file. The segmenter computes the number of Segments in each file based on the file length and the number of samples per segment, and initializes the Segments" features arrays based on the AnalysisMetaData. The user-specified parameter for this component is the offset from the start of the file from which to start creating Segments. This is necessary because the signal processing components can compute features based on window sizes that are larger than a Segment. The first Segment in a file should have its center coincident with the center of the first signal processing window.

System 100 includes a signal processor (120) for extracting features from the audio signals. Signal processor 120 includes in an embodiment MFCCGenerator 125, MFCC Filter 130, Pitch Generator 135, Stationarity Feature Generator 140, and Cepstral Variance Generator 145. Signal processor 120 is coupled to and takes input from Pre-Processor 105 and HMM 150.

MFCC Generator 125 computes the mel-frequency cepstral coefficients for a window of audio data. This component uses the front-end signal processing libraries from Carnegie Mellon University's Sphinx-4 project. These libraries provide spectral feature computation for speech data using a pipeline of configurable signal processing components. The signal processing pipeline for computing MFCCs in an embodiment uses the following components: A pre-emphasis filter with pre-emphasis of 0.97; a Hamming (raised cosine) window with an offset of 0.46, where the window size is 25.625 ms (410 samples, given the 16 kHz sample rate) and the windows are shifted 10 ms for each subsequent computation of MFCCs; a 512-point discrete Fourier transform (DFT); a mel-scale frequency filter bank with cutoff frequencies at 130 and 6800 Hz, and 40 filters; and a discrete cosine transform (DCT) that produces 13 MFCC values from the 40 filter outputs. This signal processing pipeline is defined using an XML file, which is specified by user as a parameter. As well, this component gives the user the option to normalize the $0^{th}$ MFCC, which captures the signal energy.

Signal MFCC Filter 130 performs cepstral mean normalization. MFCC values computed and stored by the MFCGenerator component are read and modified by the MFCFilter component. The user-specified parameter for this component is the window size used to compute the normalization factor. Pitch Generator 135 computes the pitch confidence score and estimates of the fundamental frequency (F0) of the pitch, and stores the result in a Pitch feature type. This component uses the Sphinx frontend signal processing to perform the windowing of the input signal. The window used is a Hamming (raised cosine) window with an offset of 0.46. The window size is 25 ms (400 samples, given the 16 kHz sample rate), and the windows are shifted 10 ms for each subsequent window. The user-specified parameters for this component are the location of the Sphinx XML configuration file, the name of the frontend signal processing component specified in the configuration file, high and low pitch F0 thresholds, an option to 3-level clip the input signal, and the 3-level clipping threshold. This component also provides the ability to store pitch values to file so that they do not need to be re-computed the next time the same file is processed. Additional parameters are available to specify when this functionality is used and where the files are stored.

Stationarity Feature Generator 140 computes stationarity features based on the MFCCs. This component reads in stored MFCC values, performs stationarity computations, and stores the results in the Stationarity feature type. The user specifies a set of window sizes to use and the stationarity computations to be performed. Cepstral Variance Feature Generator 145 computes cepstral variance features of the MFCCs. It reads in stored MFCC values, performs cepstral variation computations and stores the results in the CesptralVariance feature type.

System 100 includes a speech production model in hidden Markov model 150. HMM 150 in an embodiment includes HMM Discriminative Learning Trainer 155, HMM Forward Classifier 160, HMM Viterbi Classifier 165, Statistical Classifier 170 and Scorer 175. HMM 150 is coupled to and takes input from Signal Processor 120 and is also coupled to post-processor 180.

HMM Discriminative Learning Trainer 155 component performs the HMM training using training algorithm 400 in an embodiment. The feature data stored by the feature extraction components is used to form the observation sequences used for training, and a specification of the resulting HMM is written to a file. The user specifies the HMM initial conditions using either an existing HMM specification file or a set of configuration files that specify the state configuration, feature set, and initial state distributions. The stopping conditions for the HMM training specified by the user are a threshold for the change in the HMM parameters and a maximum number of training iterations. HMM Discriminative Learning Trainer 155 can be replaced by a Baum Welch Trainer (not shown) in an alternative embodiment.

HMM Forward Classifier 160 performs classification of the input audio segments using an HMM and the forward probability computation. The feature data stored with each Segment is used to perform the classification, and results can be stared to either a StateProbs feature type or LSSLabel feature type. Model adaptation is performed using the Baum-Welsh parameter re-estimation formulae. The user-specified parameters are the name of the HMM to use, the name of the feature set specification file, the location of the HMM files, and a set of parameters that govern the parameter re-estimation. As well, the user specifies whether to store the HMM state probabilities in a StateProbs feature type or to store the index of the most likely state in a LSSLabel feature type.

HMM Viterbi Classifier 165 performs classification of the input audio segments using an HMM and the Viterbi algorithm. The feature data stored with each Segment is used to perform the classification, and results are stored to a LSSLabel feature type. Model adaptation is performed using the Baum-Welsh parameter re-estimation formulae. The user-specified parameters are the name of the HMM to use, the name of the feature set specification file, the location of the HMM files, and a set of parameters that govern the parameter re-estimation.

Statistical Classifier 170 performs classification of the input audio segments using an HMM and the computations described above. The feature data stored with each Segment is used to perform the classification, and results can be stored to either a StateProbs feature type or LSSLabel feature type. The user-specified parameters are the name of the HMM to use, the feature set specification file, and the location of the HMM files. As well, the user specifies whether to store the HMM state probabilities in a StateProbs feature type or to store the index of the most likely state in a LSSLabel feature type.

Scorer 175 can be used to evaluate the accuracy of classification by comparing generated labels with ground truth labels and computing performance metrics based on the numbers of correct and incorrect classifications made.

System 100 includes Post-processor 180 which takes input from and is coupled to HMM 150. Post-processor 180 includes in an embodiment Detection Threshold Processor 185, Duration Filter 190, and Filled Pause Detector 195. Detection Threshold Processor 185 computes binary language speech sound/non-language speech sound labels which are stored in the LSSLabel feature type. A user-specified parameter determines whether HMM state probabilities (from the StateProbs feature types) or the most likely HMM state indices (from the LSSLabel feature types) are used as inputs. In either case, a user-specified file provides the mapping from HMM states to the binary language speech sound/non-language speech sound labels. If HMM state probabilities are used as the input, a user-specified threshold is utilized to convert these probabilities into binary labels. Parameters that govern the durational constraints applied to language speech sounds, such as the minimum duration of language speech sounds and the maximum gap between valid language speech sounds, are also specified by the user.

Duration Filter 190 enforces the two parameters (specified by the user): a minimum duration of language speech and a maximum gap between language speech sounds.

Filled Pause Sound Detector 195 attempts to detect filled pause sounds using changes in the pitch fundamental frequency. The user-specified parameters are a list of the HMM states to look for filled pause sounds in, the label to use for identified filled pause sounds, the pitch confidence threshold for determining if an F0 value is valid, the threshold for change in F0 to determine if a sound is a filled pause sound, the minimum number of valid F0 estimates for a sound to be considered a valid filled pause sound estimate, the maximum gap between valid filled pause sound candidate sounds for comparing F0, and whether to use HMM state probabilities or the most likely HMM state as inputs.

FIG. 1 illustrates an example of a system environment in which embodiments of the invention may be implemented. The system environment is exemplary only and is not intended to suggest any limitation as to the scope of use or functionality of the invention. Embodiments of the invention are operational with numerous other general purpose or special purpose computing system environments or configurations. Examples of well-known computing systems, environments, and/or configurations that may be suitable for use with embodiments of the invention include, but are not limited to, server computers, desktop computers, personal computers, hand-held or laptop devices, multiprocessor systems, microprocessor-based systems, set top boxes, programmable consumer electronics, network PCs, workstations, minicomputers, mainframe computers, telephony systems, distributed computing environments that include any of the above systems or devices, and the like.

It will be appreciated by those skilled in the art that the block diagrams herein represent conceptual views of illustrative components embodying the principles of the invention. Similarly, it will be appreciated that any flow charts, flow diagrams, state transition diagrams, pseudocode, algorithms, equations and the like represent various processes or methods which may be substantially represented or realized in computer readable media and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements and steps of the various methods shown in the figures may be computerized or provided through the use of dedicated hardware as well as hardware capable of executing software in association with appropriate software. When provided by a processor, the functions or steps may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Embodiments of the invention may be described in the general context of a program or software including computer-executable instructions, such as program modules, being executed by a computer. Generally, program modules include routines, programs, objects, components, data structures, subroutines, functions, procedures, object methods, object implementations, executable applications, applets, servlets, source code, object code, shared library/dynamic load library, and the like, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

System 100 preferably is implemented as a computing device in the form of a computer including but not limited to a processing unit, a system memory comprising computer storage media, a system bus that couples various system components including the system memory to the processing unit. The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. The phrase "computer storage media" is intended to include both volatile and nonvolatile, removable and non-removable media implemented in any method or technology for storage of information such as computer readable instructions, data structures, program modules or other data. Computer storage media includes, but is not limited to, RAM, ROM, EEPROM, USB drives, memory sticks, flash memory or other memory technology, CD-ROM, digital versatile disks (DVD) or other optical disk storage, magnetic cassettes, magnetic tape, hard disks, magnetic disk storage or other magnetic storage devices, or any other medium which can be used to store the desired information and which can be accessed by the computer. The term "communication media" typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. The computer readable media discussed above provide storage of software, computer readable instructions, data structures, program modules and other data for the computer, including an operating system, application programs, other program modules and program data. The computer operates standalone or in a networked environment using logical connections to one or more remote computers, which may be, by way of example, a server, a router, a network PC, personal computer, workstation, a hand-held device, a peer device or other common network node. In a networked environment, program modules depicted relative to the computer, or portions thereof, may be stored on one or more remote computers.

Those of skill will recognize that the techniques of the embodiments described herein may be implemented to advantage in a variety of sequential orders and that the present invention may be generally implemented in computer readable media for introduction into or use with a system for detecting non-language speech sounds. In such cases, instructions for executing the methods and algorithms described herein in detecting non-language speech sounds will be embedded in the computer readable media.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated. The described embodiments illustrate the scope of the claims but do not restrict the scope of the claims.

I claim:

1. A computerized method of detecting non-language speech sounds in an audio signal, comprising:
realizing with a computer a hidden Markov model comprising a plurality of states,
wherein at least one of the plurality of states is associated with a non-language speech sound;
isolating a segment of the audio signal;
extracting a first feature set consisting of mel-frequency cepstral coefficients (MFCCs), pitch confidence, cepstral stationarity, and cepstral variance from the segment;
using the first feature set to associate the segment with one or more of the plurality of states of the hidden Markov model; and
classifying the segment as a language speech sound or a non-language speech sound accordingly.

2. The method of claim 1, further comprising:
providing a second feature set comprising the first feature set and one or more other signs of non-language speech;

determining a second feature from the segment, wherein the second feature belongs to the second feature set; and
using the second feature to associate the segment with one or more of the plurality of states of the hidden Markov model.

3. The method of claim 2, wherein the second feature belongs to the first feature set.

4. The method of claim 1, wherein the segment is one of a plurality of segments isolated from the audio signal, and further comprising:
determining a plurality of first feature values, wherein each one of the plurality of first feature values is a determination of the first feature for one of the plurality of segments isolated from the audio signal; and
using the plurality of first feature values to associate each one of the plurality of segments isolated from the audio signal with one or more of the plurality of states of the hidden Markov model.

5. The method of claim 4, wherein the plurality of segments isolated from the audio signal and associated with one or more of the plurality of states of the hidden Markov model comprise at least two segments that are associated with different states of the hidden Markov model.

6. The method of claim 4, further comprising:
providing a second feature set comprising the first feature set and one or more other signs of non-language speech;
determining a plurality of second feature values, wherein each one of the plurality of second feature values is a determination of the second feature for one of the plurality of segments isolated from the audio signal; and
using the plurality of second feature values to associate each one of the plurality of segments isolated from the audio signal with one or more of the plurality of states of the hidden Markov model.

7. The method of claim 6, wherein each of the plurality of second feature values belongs to the first feature set.

8. The method of claim 1, wherein the non-language speech sound associated with at least one of the plurality of states comprises at least one of: silence, filled pause, cough, laugh, lipsmack, microphone, background speech, noise, and breath.

9. The method of claim 1, wherein at least one of the plurality of states is associated with a non-language speech sound comprising at least one of silence, filled pause, cough, laugh, lipsmack, microphone, background speech, noise, and breath.

10. The method of claim 1, wherein the at least one of the plurality of states is associated with a non-language speech sound comprising at least two of silence, filled pause, cough, laugh, lipsmack, microphone, background speech, noise, and breath.

11. The method of claim 1, wherein the first feature is used to associate the segment with one of the plurality of states of the hidden Markov model.

12. The method of claim 1, wherein a user-specifiable detection threshold is used to classify the segment as a language speech sound or a non-language speech.

13. The method of claim 12 further comprising computing the probability that the segment belongs to each of the plurality of states of the hidden Markov model.

14. The method of claim 1, further comprising training the hidden Markov model.

15. The method of claim 14, further comprising adapting the trained hidden Markov model to the speech signal that is to be classified.

16. The method of claim 14, wherein training the hidden Markov Model comprises re-estimating one or more parameters of the hidden Markov model based on one or more observation sequences and a label sequence for each of the one or more observation sequences.

17. The method of claim 14, further comprising using discriminative learning to train the hidden Markov Model.

18. The method of claim 14, further comprising using maximum mutual information optimization criteria to train the hidden Markov Model.

19. The method of claim 14, further comprising evaluating all possible classification label sequences for a plurality of input observation sequences.

20. The method of claim 19, further comprising formatting the plurality of input observation sequences into a plurality of shorter observation sequences.

21. The method of claim 1, wherein the hidden Markov model is ergodic.

22. The method of claim 1, further comprising outputting classification data.

23. A computerized method of classifying sounds in an audio signal into language speech sounds and non-language speech sounds, the method comprising:
realizing in a computer a hidden Markov model comprising a plurality of hidden Markov states;
providing a plurality of classification labels such that there is a one-to-many mapping between each of the plurality of classification labels and the plurality of hidden Markov states;
training the hidden Markov model, comprising:
providing a plurality of input observation sequences, wherein each of the plurality of input observation sequences comprises a plurality of input observations;
providing correct classification labels for each input observation sequence, such that one correct label is assigned to each of the plurality of input observations;
determining an observation sequence associated with a plurality of segments isolated from the audio signal, wherein the observation sequence comprises at least one observation for each one of the plurality of segments isolated from the audio signal; and
associating the observation sequence with a sequence of hidden Markov states,
whereby the one-to-many mapping determines a classification label for each one of the plurality of segments isolated from the audio signal,
wherein the plurality of classification labels comprises a label for non-language speech sounds, and
wherein the at least one observation consists of: mel-frequency cepstral coefficients (MFCCs), a pitch confidence measurement, a cepstral stationarity measurement, and a cepstral variance measurement.

24. The method of claim 23 further comprising computing label dependent forward and backward probabilities.

25. The method of claim 23 further comprising:
formatting the plurality of input observation sequences into shorter observation sequences; and
evaluating all possible classification label sequences for the shorter observation sequences.

26. An apparatus for detecting non-language speech sounds in an audio signal, comprising:
a programmed processor; and
computer-readable media storing instructions that, when executed on the programmed processor,
provide a hidden Markov model comprising a plurality of states, wherein at least one of the plurality of states is associated with a non-language speech sound;
isolate a segment of an audio signal;
extract a first feature set consisting of mel-frequency cepstral coefficients (MFCCs), pitch confidence, cepstral stationarity, and cepstral variance from the segment;
use the first feature set to associate the segment with one or more of the plurality of states of the hidden Markov mode; and
classify the segment as a language speech sound or a non-language speech sound accordingly.

27. A computerized speech recognition system for detecting non-language speech sounds comprising:
a pre-processor adapted to isolate a plurality of segments from an audio signal;
a signal processor,
the signal processor adapted to extract from each of the plurality of segments isolated from the audio signal the following feature set: mel-frequency cepstral coefficients (MFCCs), a pitch confidence measurement, a cepstral stationarity measurement, and a cepstral variance measurement;
a computerized hidden Markov model comprising a plurality of hidden Markov states and many-to-one mappings between the plurality of hidden Markov states and a plurality of classification labels,
at least one of the plurality of classification labels comprising at least one non-language speech sound,
whereby the computerized hidden Markov model is adapted to use the feature set to associate each of the plurality of segments with one or more of the plurality of hidden Markov states and to classify each of the plurality of segments as a language speech sound or a non-language speech sound; and
a post-processor coupled to the computerized hidden Markov model.

* * * * *